(12) United States Patent
Nissan

(10) Patent No.: US 10,403,271 B2
(45) Date of Patent: Sep. 3, 2019

(54) SYSTEM AND METHOD FOR AUTOMATIC LANGUAGE MODEL SELECTION

(71) Applicant: NICE LTD., Ra'anana (IL)

(72) Inventor: Maor Nissan, Herzliya (IL)

(73) Assignee: NICE Ltd., Ra'anana (IL)

( * ) Notice: Subject to any disclaimer, the term of this patent is extended or adjusted under 35 U.S.C. 154(b) by 637 days.

(21) Appl. No.: 14/736,282

(22) Filed: Jun. 11, 2015

(65) Prior Publication Data

US 2016/0365093 A1    Dec. 15, 2016

(51) Int. Cl.
    *G10L 15/18* (2013.01)
    *G10L 15/187* (2013.01)
    *G10L 15/183* (2013.01)
    *G06F 17/27* (2006.01)

(52) U.S. Cl.
    CPC .......... *G10L 15/187* (2013.01); *G10L 15/183* (2013.01); *G06F 17/2735* (2013.01)

(58) Field of Classification Search
    CPC ....................... G10L 15/265; G10L 2015/0635
    See application file for complete search history.

(56) References Cited

U.S. PATENT DOCUMENTS

| | | |
|---|---|---|
| 8,078,467 B2 | 12/2011 | Wu et al. |
| 8,548,808 B2 | 10/2013 | Nakano et al. |
| 2008/0270133 A1* | 10/2008 | Tian ........................ G10L 15/01 704/251 |
| 2011/0153324 A1 | 6/2011 | Ballinger et al. |
| 2012/0022866 A1 | 1/2012 | Ballinger et al. |
| 2016/0155437 A1* | 6/2016 | Kanevsky ............... G10L 15/22 704/254 |

FOREIGN PATENT DOCUMENTS

WO    WO 2014/150104 A1    9/2014

* cited by examiner

*Primary Examiner* — Qian Yang
(74) *Attorney, Agent, or Firm* — Pearl Cohen Zedek Latzer Baratz LLP

(57) ABSTRACT

A system and method for generating a transcript of an audio input. An embodiment of a system and method may include generating a phonetic lattice by decoding the audio input and producing a transcription based on the phonetic lattice and based on a first language model. A transcription may be analyzed to produce analysis results. Analysis results may be used to select from a plurality of language models, one language model and the selected language model may be used to generate a transcript of the audio input.

13 Claims, 4 Drawing Sheets

610 — GENERATING A PHONETIC LATTICE BY DECODING AN AUDIO INPUT

615 — PRODUCING A TRANSCRIPTION BASED ON THE PHONETIC LATTICE AND BASED ON A FIRST LANGUAGE MODEL

620 — ANALYZING THE TRANSCRIPTION TO PRODUCE ANALYSIS RESULTS AND SELECTING, FROM A PLURALITY OF LANGUAGE MODELS AND BASED ON THE ANALYSIS RESULT, A SECOND LANGUAGE MODEL

625 — USING THE SECOND LANGUAGE MODEL TO GENERATE A SECOND TRANSCRIPT OF THE AUDIO INPUT

WORD ASR OUTPUT

| START TIME | DURATION | WORD | PROB | WORD | PROB | WORD | PROB |
|---|---|---|---|---|---|---|---|
| 0.75 | 0.83 | ~SIL | 99.80% | </S> | 0.20% | | |
| 1.58 | 0.2 | THEY | 66.60% | THINK | 31.10% | I | 1.10% |
| 1.78 | 0.11 | COULD | 66.60% | IF | 15.30% | IT | 14.70% |
| 1.89 | 0.11 | BUT | 61.50% | IT | 19.00% | WOULD | 11.90% |
| 2 | 0.27 | DIDN'T | 99.00% | COULDN'T | 1.00% | | |

510 ↗

SUB-WORD ASR OUTPUT

| START TIME | DURATION | WORD | PROB | WORD | PROB | WORD | PROB |
|---|---|---|---|---|---|---|---|
| 0.75 | 0.83 | ~SIL | 99.80% | </S> | 0.20% | | |
| 1.58 | 0.2 | TH | 66.60% | EH | 31.10% | IH | 1.10% |
| 1.78 | 0.11 | B | 66.60% | AH | 15.30% | IT | 14.70% |
| 1.89 | 0.11 | EY | 61.50% | OW | 19.00% | D | 11.90% |
| 2 | 0.27 | M | 99.00% | P | 1.00% | | |

520 ↗

US 10,403,271 B2

SYSTEM AND METHOD FOR AUTOMATIC LANGUAGE MODEL SELECTION

FIELD OF THE INVENTION

The present invention relates generally to converting audio content into text. More specifically, the present invention relates to automatic selection of a language model in speech to text (TTS) systems and methods.

BACKGROUND OF THE INVENTION

Speech to text (STT) systems and methods that produce text output based on audio input are known in the art. To convert speech to text, STT systems use dictionaries. Dictionaries have a finite vocabulary size. One of the problems faced by STT systems is the balance between out-of-vocabulary (OOV) error rate, word error rate and performance of an STT system. Generally, using a large vocabulary may reduce the OOV rate but may also reduce system performance and increase error rate (e.g., more confusable words to choose from), while using a small set of words or vocabulary typically improves system performance but also increases the OOV error rate.

SUMMARY OF THE INVENTION

An embodiment of a system and method according to the invention may include generating a phonetic lattice by decoding an audio input and producing a first transcription based on the phonetic lattice and based on a first language model. The first transcription may be analyzed and analysis results may be produced. A language model may be selected, from a plurality of language models, based on the analysis results. The selected second language model may be used to generate a second transcript of the audio input.

An embodiment of a system and method according to the invention may include associating words identified in the first transcription with a certainty value calculated for each identified word; including words associated with a certainty value higher than a first threshold value in a combined index; combining at least two sub-words identified in the transcription to produce a word and including the produced word in the combined index; and using the combined index to select the second language model.

An embodiment of a system and method according to the invention may include selecting a second language model based on calculating a plurality of match values by relating a respective plurality of specific language models to a combined index and selecting a specific language model associated with the highest match value.

An embodiment of a system and method according to the invention may include associating sub-words identified in a first transcription with a certainty value calculated for each identified sub-word, identifying, in the first transcription, a sequence of sub-words associated with a certainty value higher than a threshold value, producing a word based on the identified sequence of sub-words, including the produced word in a combined index, and using the combined index to select a second language model for decoding the audio input.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features and advantages thereof, may best be understood by reference to the following detailed description when read with the accompanied drawings. Embodiments of the invention are illustrated by way of example and not limitation in the figures of the accompanying drawings, in which like reference numerals indicate corresponding, analogous or similar elements, and in which:

Figure 1:
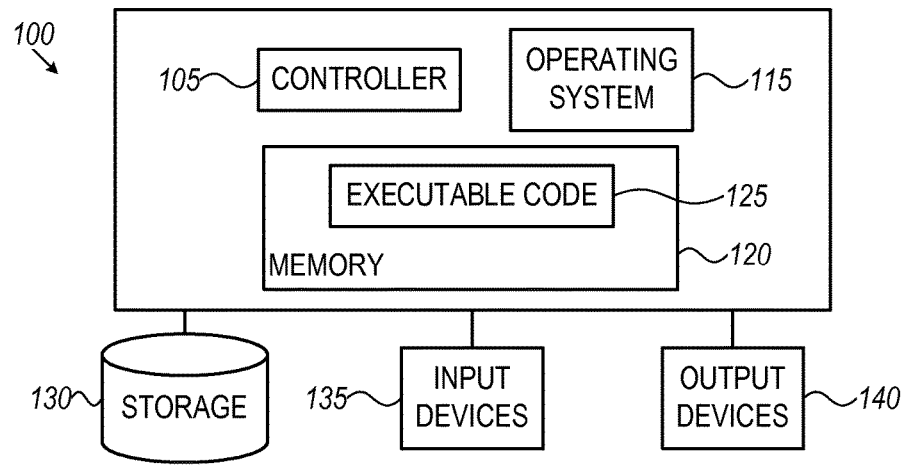
FIG. 1 shows a high level block diagram of an exemplary computing device according to embodiments of the present invention.

It will be appreciated that, for simplicity and clarity of illustration, elements shown in the figures have not necessarily been drawn accurately or to scale. For example, the dimensions of some of the elements may be exaggerated relative to other elements for clarity, or several physical components may be included in one functional block or element. Further, where considered appropriate, reference numerals may be repeated among the figures to indicate corresponding or analogous elements.

DETAILED DESCRIPTION OF THE INVENTION

In the following detailed description, numerous specific details are set forth in order to provide a thorough understanding of the invention. However, it will be understood by those skilled in the art that the present invention may be practiced without these specific details. In other instances, well-known methods, procedures, and components, modules, units and/or circuits have not been described in detail so as not to obscure the invention. Some features or elements described with respect to one embodiment may be combined with features or elements described with respect to other embodiments. For the sake of clarity, discussion of same or similar features or elements may not be repeated.

Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium that may store instructions to perform operations and/or processes. Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. The term set when used herein may include one or more items. Unless explicitly stated, the method embodiments described herein are not constrained to a particular order or sequence. Additionally, some of the described method embodiments or elements thereof can occur or be performed simultaneously, at the same point in time, or concurrently.

Reference is made to FIG. 1, showing a high level block diagram of an exemplary computing device according to embodiments of the present invention. Computing device 100 may include a controller 105 that may be, for example, a central processing unit processor (CPU), a chip or any suitable computing or computational device, an operating system 115, a memory 120, an executable code 125, a storage 130, input devices 135 and output devices 140. Controller 105 may be configured to carry out methods described herein, and/or to execute or act as the various modules, units, etc. More than one computing device 100 may be included, and one or more computing devices 100 may act as the various components, for example the components shown in FIG. 2. For example an indexing unit described herein may be, or may include components of, computing device 100. For example, by executing executable code 125 stored in memory 120, controller 105 may be configured to carry out a method of generating a transcript of an audio input as described herein. For example, controller 105 may be configured to generate a phonetic lattice by decoding the audio input, produce a transcription based on the phonetic lattice and based on a first (main) language model, analyze the transcription to produce analysis results and select, from a plurality of language models and based on the analysis result, a second language model and use the second language model to generate a second (or final) transcript of the audio input. For example, indexing unit 230 and matching unit 240 may be or may include a controller 105, memory 120 and executable code 125. For example, units shown in FIG. 2 and elsewhere may be tasks or applications executed by controller 105.

Operating system 115 may be or may include any code segment (e.g., one similar to executable code 125 described herein) designed and/or configured to perform tasks involving coordination, scheduling, arbitration, supervising, controlling or otherwise managing operation of computing device 100, for example, scheduling execution of software programs or enabling software programs or other modules or units to communicate. Operating system 115 may be a commercial operating system.

Memory 120 may be or may include, for example, a Random Access Memory (RAM), a read only memory (ROM), a Dynamic RAM (DRAM), a Synchronous DRAM (SD-RAM), a double data rate (DDR) memory chip, a Flash memory, a volatile memory, a non-volatile memory, a cache memory, a buffer, a short term memory unit, a long term memory unit, or other suitable memory units or storage units. Memory 120 may be or may include a plurality of, possibly different memory units. Memory 120 may be a computer or processor non-transitory readable medium, or a computer non-transitory storage medium, e.g., a RAM.

Executable code 125 may be any executable code, e.g., an application, a program, a process, task or script. Executable code 125 may be executed by controller 105 possibly under control of operating system 115. For example, executable code 125 may be an application that generates a transcript of an audio input as further described herein. Although, for the sake of clarity, a single item of executable code 125 is shown in FIG. 1, a system according to embodiments of the invention may include a plurality of executable code segments similar to executable code 125 that may be loaded into memory 120 and cause controller 105 to carry out methods described herein. For example, units or modules described herein (e.g., indexing unit 230 and matching unit 240) may be, or may include, controller 105 and executable code 125.

Storage 130 may be or may include, for example, a hard disk drive, a floppy disk drive, a Compact Disk (CD) drive, a CD-Recordable (CD-R) drive, a Blu-ray disk (BD), a universal serial bus (USB) device or other suitable removable and/or fixed storage unit. Content may be stored in storage 130 and may be loaded from storage 130 into memory 120 where it may be processed by controller 105. In some embodiments, some of the components shown in FIG. 1 may be omitted. For example, memory 120 may be a non-volatile memory having the storage capacity of storage 130. Accordingly, although shown as a separate component, storage 130 may be embedded or included in memory 120.

Input devices 135 may be or may include a mouse, a keyboard, a touch screen or pad or any suitable input device. It will be recognized that any suitable number of input devices may be operatively connected to computing device 100 as shown by block 135. Output devices 140 may include one or more displays or monitors, speakers and/or any other suitable output devices. It will be recognized that any suitable number of output devices may be operatively connected to computing device 100 as shown by block 140. Any applicable input/output (I/O) devices may be connected to computing device 100 as shown by blocks 135 and 140. For example, a wired or wireless network interface card (NIC), a printer, a universal serial bus (USB) device or external hard drive may be included in input devices 135 and/or output devices 140.

Some embodiments of the invention may include an article such as a computer or processor non-transitory readable medium, or a computer or processor non-transitory storage medium, such as for example a memory, a disk drive, or a USB flash memory, encoding, including or storing instructions, e.g., computer-executable instructions, which, when executed by a processor or controller, carry out methods disclosed herein. For example, an article may include a storage medium such as memory 120, computer-executable instructions such as executable code 125 and a controller such as controller 105.

Some embodiments may be provided in a computer program product that may include a non-transitory machine-readable medium, stored thereon instructions, which may be used to program a computer, controller, or other programmable devices, to perform methods as disclosed herein. Some embodiments of the invention may include an article such as a computer or processor non-transitory readable medium, or a computer or processor non-transitory storage medium, such as for example a memory, a disk drive, or a USB flash memory, encoding, including or storing instructions, e.g., computer-executable instructions, which when executed by a processor or controller, carry out methods disclosed herein. The storage medium may include, but is not limited to, any type of disk including, semiconductor devices such as read-only memories (ROMs) and/or random access memories (RAMs), flash memories, electrically erasable programmable read-only memories (EEPROMs) or any type of media suitable for storing electronic instructions, including programmable storage devices. For example, in some embodiments, memory 120 is a non-transitory machine-readable medium.

A system according to embodiments of the invention may include components such as, but not limited to, a plurality of central processing units (CPU) or any other suitable multipurpose or specific processors or controllers (e.g., controllers similar to controller 105), a plurality of input units, a plurality of output units, a plurality of memory units, and a plurality of storage units. A system may additionally include other suitable hardware components and/or software components. In some embodiments, a system may include or may be, for example, a personal computer, a desktop computer, a laptop computer, a workstation, a server computer, a network device, or any other suitable computing device. For example, a system as described herein may include one or more devices such as computing device 100.

An embodiment of system and method according to the invention may receive audio content (e.g., a recorded or live conversation) and decode the audio content using a large language model or dictionary. Decoding the audio content may produce a transcription of the audio content, e.g., a transcription of a call. A transcription of audio content produced using a dictionary may be indexed by an indexing unit that may provide an indexed and/or structured data object. Indexed or structured data may be provided as input to a matching unit that may match the indexed data with a plurality or set of language models. Based on the matching, one language model may be selected from the set or plurality of language models. A selected language model may be used on the original or input audio content in order to produce a final transcription of the audio content. The selected LM may be a language specific, typically small LM, accordingly, embodiments of a system and method may reduce word error rate and increase detection when generating a transcription of audio content.

Known speech to text engines have a limited vocabulary which is determined by their internal dictionary. As known in the art, using a large dictionary increases the word error rate. On the other hand, using a small dictionary increases the probability of errors known in the art as out-of-vocabulary (OOV), failing to identify legitimate words or phrases due to a too small dictionary. As described, using an automated language model selection, embodiments of a system and method according to the invention reduce the word error rate by using specific small dictionaries (thus overcome the "large dictionary" problem) without suffering from OOV within the dictionary (thus overcome the "too small dictionary" problem).

The term "transcription" as referred to herein may be or may include a textual representation of audio content. For example, a transcription of a call may be or may include a file (that may be stored on a server or sent over a computer network) where the file includes text spoken in the call. An indexed transcription or a structured data object generated by indexing a transcription may be a vector or other construct that includes one or more words and/or phrases and one or more probabilities, ranks or scores associated with words or phrases. For example, an indexed transcription may include a set of words and may further include, for each word, a probability value, a rank or score. For example, a transcription may be the output of a language model as known in the art.

Language models are known in the art. Generally, a statistical language model assigns probability values (or ranks or scores) to words or phrases and probability value assigned to a word or phrase is a measure of the likelihood that the word or phrase is a legitimate word or phrase.

Decoding audio content (e.g., using a large language model, a dictionary or a language specific model) may include analyzing the audio content and producing textual data based on the analyzed audio content. For example, decoding a recording of a call or conversation may produce a transcription. Matching an indexed transcription with a plurality or set of language models may be done by an embodiment of a system or method according to the invention using the probability values, a ranks or scores in the indexed transcription.

Figure 2:
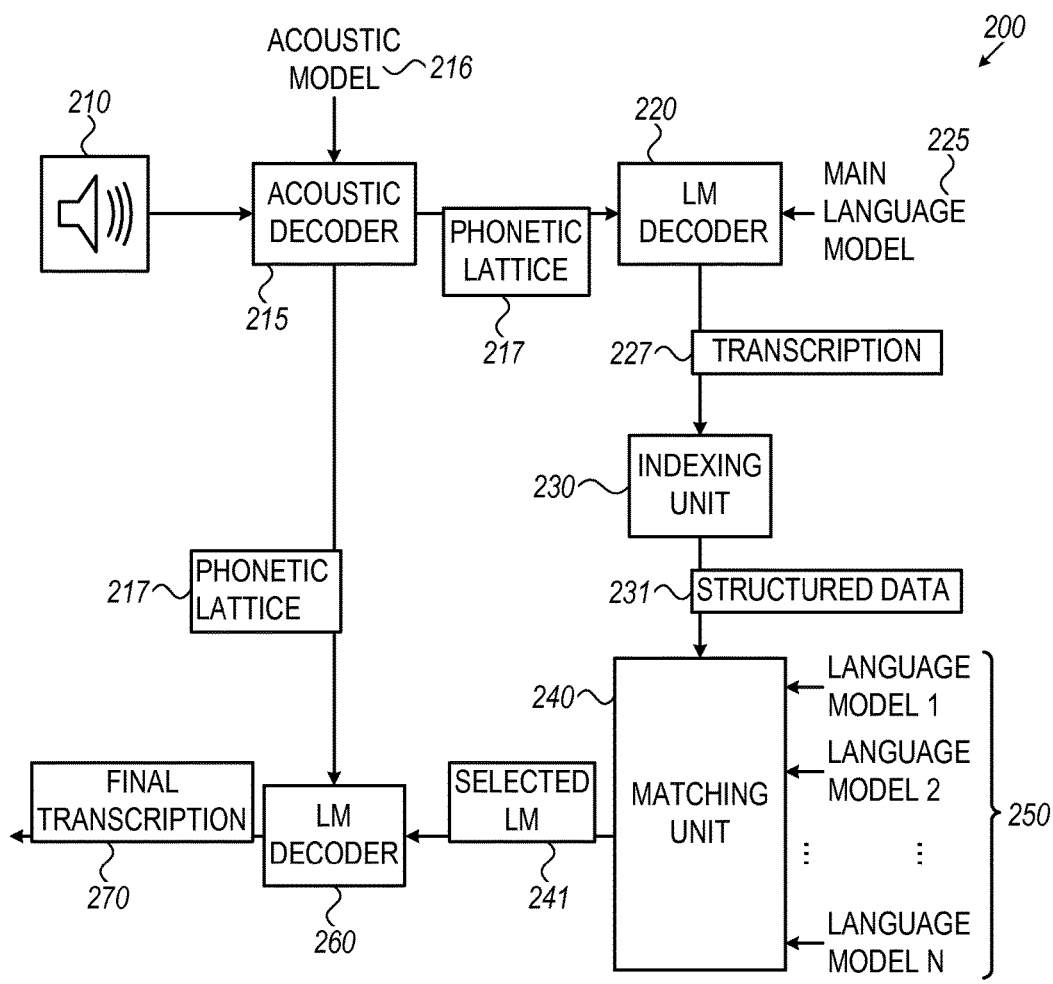
FIG. 2 is an overview of a system according to embodiments of the present invention.

Reference is made to FIG. 2, an overview of an exemplary system 200 and exemplary flows according to embodiments of the present invention. As shown, audio input 210 may be provided to an embodiment of a system or method. Audio input 210 may be any audio content as known in the art, e.g., a recording of a conversation, a recording of spoken words or a synthesized audio content, e.g., generated by a computer or machine. As shown, system 200 may include an acoustic decoder 215, a language model (LM) decoder 220, an indexing unit 230, a matching unit 240 and an LM decoder 260.

According to some embodiments of the invention, input audio 210 may be decoded by acoustic decoder 215 using acoustic model 216. Acoustic models and their usage by acoustic decoders are known in the art. Generally, an acoustic model is used in Automatic Speech Recognition to represent the relationship between an audio signal and the phonemes or other linguistic units that make up speech. Typically, an acoustic model is created based on a set of audio recordings and their corresponding transcripts. For example, software is used to create statistical representations of the sounds that make up each word in a recording. The output of the acoustic decoder 215 may be phonetic lattice 217. A phonetic lattice is known in the art, for example, phonetic lattice 217 may be a directed acyclic graph (e.g., as described in http://en.wikipedia.org/wiki/Deterministic_a-cyclic_finite_state_automaton), which represents, records and/or provides the probability of each phoneme to be output at a certain time. Accordingly, sub-words, words and/or phrases provided to components of a system or method according to embodiments of the invention may be assigned, or associated with, a certainty value, a probability value or a score or rank value. For example, phonetic lattice 217 may include all possible tracks of phonetic transcriptions for a certain audio file provided as input audio 210 and, using the probabilities of words and phrases, a probability for each track may be calculated.

Acoustic decoder 215 may be an acoustic decoder or a phonetic engine module that produces a phonetic lattice as known in the art. For example, Acoustic decoder 215 and phonetic lattice 217 may be as described in "Rabiner, Lawrence "A tutorial on hidden Markov models and selected applications in speech recognition." Proceedings of the IEEE 77.2 (1989): 257-286".

Generally, LM decoders 220 and 260 may be decoders that use language models as known in the art, for example, as described in http://en.wikipedia.org/wiki/Language_model. A dictionary may be is a table of words and their phoneme transcriptions, for example, a dictionary may be the below list of words and their phoneme transcriptions:

---

ACTRESS(01) AE K T R IH S
ACTRESS'S(01) AE K T R IH S IH Z
ACTRESSES(01) AE K T R IH S IH Z
ACTS(01) AE K TS
ACTUAL(01) AE K CH UW AX L
ACTUALITY(01) AE K CH UW AE L IH T IY
ACTUALLY(01) AE K CH AX L IY
ACTUALLY(02) AE K CH UH L IY
ACTUALLY(03) AE K CH UW AX L IY

---

As shown, a phonetic lattice may be provided as input to LM Decoder 220. As further shown, main language model 225 may be used by, or provided as input to, LM Decoder 220. For example, main language model 225 may be a general language model that models the general words probability in a language. Using main language model 225, LM Decoder 220 may generate transcription 227. For example, using main language model 225, LM Decoder 220 may extract words, terms or phrases from phonetic lattice 217 and include extracted words, terms or phrases in transcription 227.

As shown, transcription 227 may be provided as input to indexing unit 230 that may create, produce or generate a feature vector or structured data 231. Indexing unit 230 may include three components or units: Hybrid language model (LM) Vector space model (VSM) 310, Key phrases VSM 320 and raw transcription vector 330. Components and units in indexing unit 230 are further described below. Structured data 231 may include output of units Hybrid LM VSM 310, Key phrases VSM 320 and raw transcription vector 330. Generally, a vector space model or VSM is an algebraic model for representing text documents as known in the art, e.g., as described in http://en.wikipedia.org/wiki/Vector_space_model.

As shown, using structured data 231; matching unit 240 may select one of language models 250. For example, matching unit 240 may match a feature vector in structured data 231 with a set or plurality of N language models and may select, based on the matching, the best language model for the input structured data or feature vector. For example, matching unit 240 may match structured data 231 with a set or plurality of N language models using (but not limited to) the cosine similarity measure and perplexity as further described herein.

As further shown, the selected language model 241 is provided as input to LM 260. LM 260 may further be provided with the original or input audio content 210 and use the selected language model 241 to generate final transcription 270.

Accordingly, an embodiment of a system or method according to the invention may generate a phonetic lattice by decoding the audio input, for example, acoustic decoder 215 may generate phonetic lattice 217 for input audio input 210. LM decoder 220 may produce a transcription (e.g., transcription 227) based on a phonetic lattice (e.g., based on phonetic lattice 217) and based on a first language model (e.g., main language model 225). Indexing unit 230 may analyze the transcription to produce analysis results. For example, the analysis results may be or may include structured data 231. Matching unit 240 may select, from a plurality of language models (e.g., from the set of language models 250), based on the analysis result, a second (or selected) language model. For example, based on structured data 231, matching unit 240 may select LM 241. LM decoder 260 may use the second (or selected) language model to generate a second transcription of the audio input. For example, the second transcription may be final transcription 270 that may be created, generated or produced by LM decoder 260 based on phonetic lattice 217 and based on, or using, selected LM 241.

For example, a first language model (e.g., main language model 225) may be a general model, e.g., a model that includes, or is generated based on, a large dictionary. A second language model may be a specific language model. For example, selected LM 241 may be a language or context specific LM, e.g., an LM that includes, or is generated based on, a specific language or context. For example, due to its small dictionary, selected LM 241 may identify terms, words or phrases in phonetic lattice 217 with very low word error rate (a phenomena encountered by large dictionaries). Moreover, due to its matching with the content of input audio 210, selected LM 241 may identify terms, words or phrases in phonetic lattice 217 with a very low out-of-vocabulary (OOV) error rate.

Figure 3:
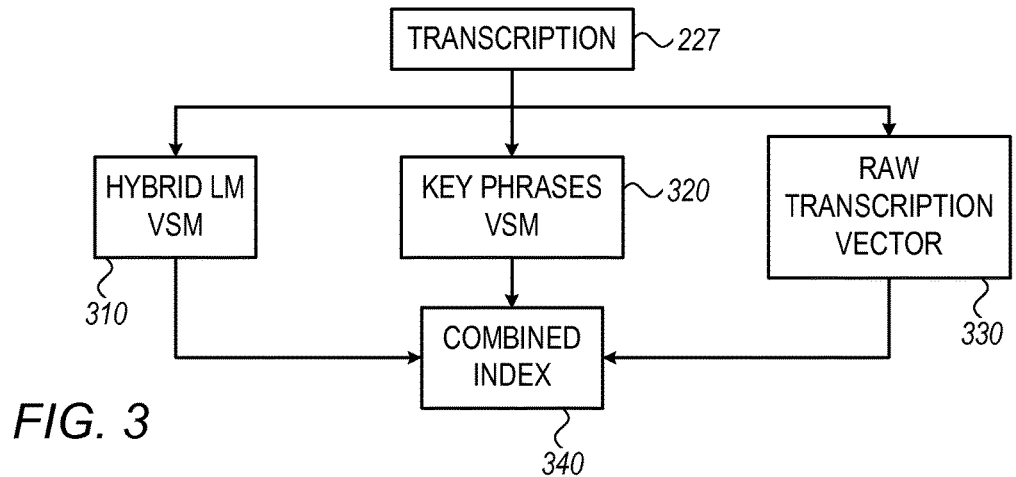
FIG. 3 is an overview of a system according to embodiments of the present invention.

Reference is made to FIG. 3, an overview of exemplary components that may be included in a system according to embodiments of the present invention. In an embodiment, the components shown in FIG. 3 may be included in indexing unit 230. As shown, indexing unit 230 may receive transcription 227 as input. As further shown, indexing unit 230 may include a hybrid LM Vector space model (VSM) 310, a key phrases VSM 320, and a raw transcription VSM 330.

Hybrid LM VSM 310 may include two models, a word automatic speech recognition (ASR) model that may extract words from a transcription and a sub-word ASR model. ASR models are known in the art. Generally, provided with input, an ASR model outputs a sequence of symbols and quantities, e.g., in the form of a phonetic lattice as described herein. As known in the art, an ASR model may be created or trained for, or based on, a specific set of words. For example, a word dictionary may be used to train the word ASR model and a sub-words dictionary may be used to train or generate the sub-word ASR model, e.g., as known in the art.

For example, using the word ASR model, Hybrid LM VSM 310 may extract words (e.g., a lattice of words) from transcription 227. Using a sub-word ASR model, Hybrid LM VSM 310 may extract a lattice of sub-words. Hybrid LM VSM 310 may combine or merge two lattices into one lattice. For example, a lattice or list of words and a lattice or list of sub-words may be combined into one list or lattice of words.

Hybrid LM VSM 310 may use two ASR models, a word ASR model and a sub-words ASR model. For example, words and sub-words dictionaries may be used to train ASR's used by Hybrid LM VSM 310. Hybrid LM VSM 310 may extract, from transcription 227, two lattices, one of, or including, words and another one of sub-words. A lattice of words and a lattice of sub-words may be merged or combined into one lattice.

For example, Hybrid LM VSM 310 may examine all words (and their associated probability or certainty values) in a lattice extracted from transcription 227 by a word ASR, select the words associated with certainty or probability value that is greater than threshold θ and insert the selected words into a combined list.

With respect to sections, parts or portions of an input transcription where words cannot be identified with a given confidence or probability level (e.g., only words or phrases associated with a certainty value that is less than θ), hybrid LM VSM 310 may utilize sub-words.

For example, in some areas of transcription 227, where identified sub-words certainty is greater than a second threshold (e.g., α), if a set of sub words sums up to, or can be used to produce, a word included in the word dictionary, the word produced based on the sub-words may be included in a combined list or lattice. For example, if the set of sub-words "_N", "_IY" and "_T" is detected then the word "NEAT" may be deduced and/or produced based on the set of sub-words and the word "NEAT" may be inserted into the combined list. A certainty or probability of a set of sub-words may be identified or determined as described herein, e.g., with respect to an output of an acoustic decoder as described in http://en.wikipedia.org/wiki/Deterministic_a- cyclic_finite_state_automaton. Accordingly, sub-words in a transcription may be assigned or associated with a certainty or probability value and areas in the transcription where the certainty or probability of a set of sub-words is higher than a threshold, e.g., α may be identified.

Figure 4:
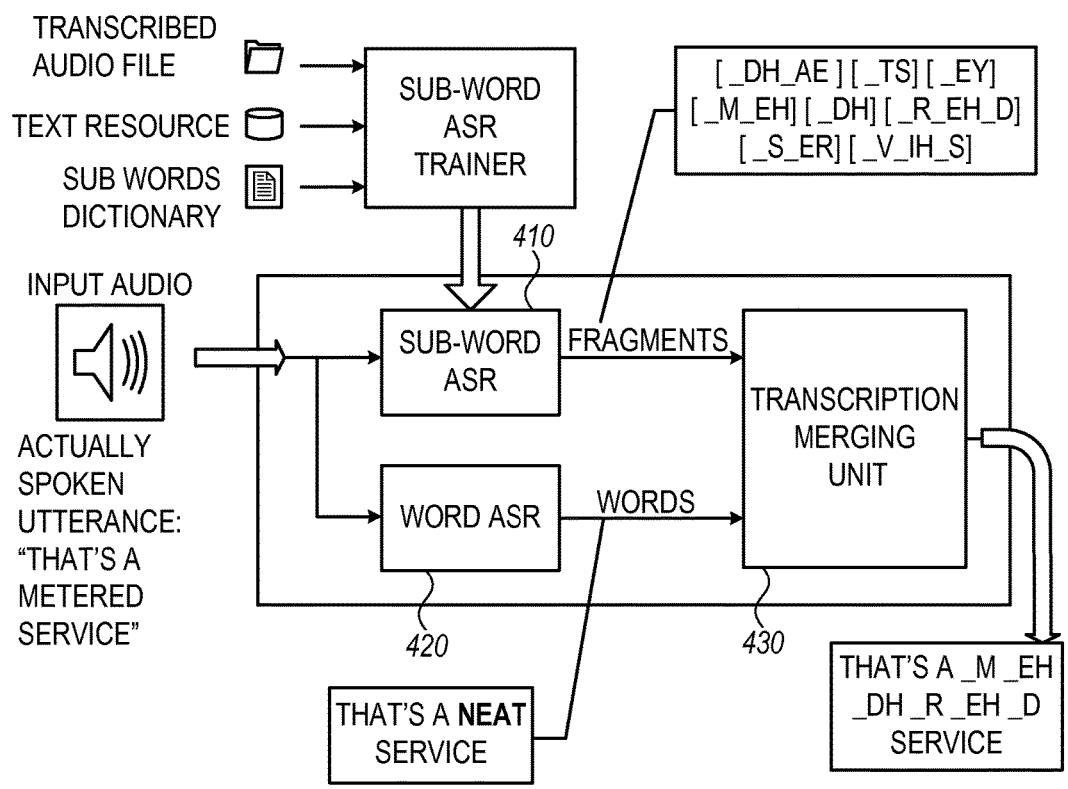
FIG. 4 is an overview of components of a system according to embodiments of the present invention.

Reference is made to FIG. 4, showing components of a system according to embodiments of the present invention. As shown, a system may include a sub-words ASR 410, a words ASR 420 and a transcription merging unit 430. As shown, a sub-words ASR 410 may be trained by a sub-words ASR trainer that may use as input transcribed audio files (e.g., an audio file with matching text), text resource that may be used for learning the statistical structure of the sub-words sequences as known in the art and a sub-words dictionary. Training of sub-words ASR 410 may be as known in the art, e.g., as described in http://people.sabanciuniv.edu/~berrin/cs512/reading/rabiner-tutorial-on-hmm.pdf.

As shown, output from a sub-words ASR 410 and words ASR 420 may be merged by merging unit 430. For example and as shown, given an input of an actually spoken utterance "THAT'S A METERED SERVICE", words ASR 420 may output the phrase "THAT'S A NEAT SERVICE" where the word "NEAT" may be associated with a low probability value. As shown, based on the same input, sub-words ASR 410 may identify or extract the combinations or sub-words [_DH_AE] [_TS] [_EY], [_M_EH] [_DH] [_R_EH_D] and [_S_ER] [_V_IH_S]. As further shown, merging unit 430 may combine outputs of ASR's 410 and 420 to produce "THAT'S A_M_EH_DH_R_EH_D SERVICE". Once the transcription merging unit has output the final transcription of words and sub-words, the sub-words sequences are checked versus known words (e.g., from a dictionary) and if a set or sequence of sub-words sums up to an existing word in the dictionary, the set or sequence of sub-words may be replaced by the word. For example, the sequence or set of sub-words "[_N] [_IY] [_T]" may be identified, and replaced by, the word "NEAT" found in a dictionary.

Figures 5A, 5B:
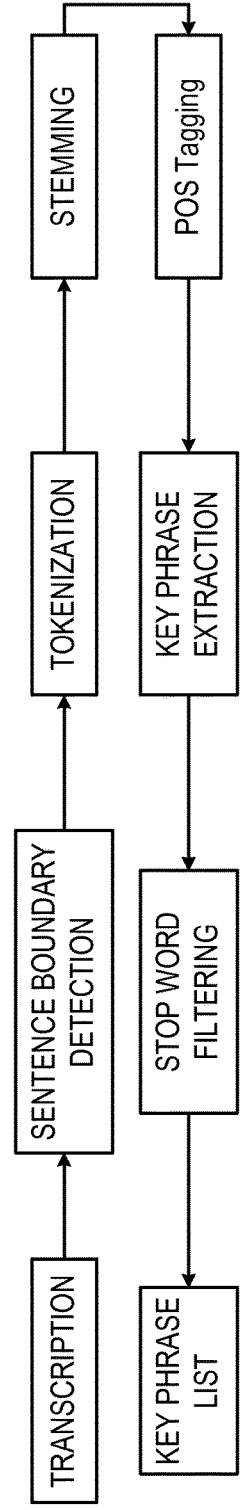
FIG. 5A shows exemplary outputs of units according to embodiments of the present invention.
FIG. 5B shows exemplary input, processing and output of a unit according to embodiments of the present invention.

Reference is additionally made to FIG. 5A, showing an example of output of a word ASR (block 510) and an example of output a sub-word ASR (block 520) according to embodiments of the present invention. It is noted that the examples shown in FIG. 5A are limited to 2-Best, however, an N-Best output for any N may be produced by embodiments of the invention as known in the art. As known in the art, N-best is a search method or procedure that is guaranteed to find the N most likely whole sentence alternatives that are within a given beam of the most likely sentence, e.g., as further explained in http://ieeexplore.ieee.org/xpl/login.jsp?tp=&arnumber=115542&url=http%3A%2F%2Fieeexplore.ieee.org%2Fiel5%2F132%2F3385%2F00115542.pdf %3Farnumber %3D115542.

Indexing unit 230 may convert the combined list of words into a vector space model, e.g., by using an STT dictionary as known in the art. In an embodiment, the vector space model may be the size of a dictionary used by word ASR 420. Key phrases VSM 320 may process transcription 227 and produce an output key phrases list. Some of the operations included in producing an output key phrases list are further described.

Reference is additionally made to FIG. 5B, showing exemplary input, processing and output of key phrases VSM 320 according to embodiments of the present invention. As shown, key phrases VSM 320 may receive a transcription as input and perform sentence boundary detection, tokenization, stemming, part of speech (POS) tagging, key phrase extraction and stop word filtering to produce an output in the form of a key phrase list.

Key phrases VSM 320 may convert portions of transcription 227 to tokens or associate portions of transcription 227 with tokens (e.g., using tokenization as known in the art). Other operations performed by key phrases VSM 320 may be stop words filtering, key phrase extraction, stemming, Part-Of-Speech (POS) tagging, Key phrase extraction and stop words filtering as known in the art. Key phrases VSM 320 may index key phrases identified in transcription 227 and their frequencies. For example, indexing key phrases may include generating a list of key phrases and the number of times they appear in transcription 227 such that each key phrase is assigned, or associated with, a frequency value. An output of key phrases VSM 320 may be, or may include a list of key phrases and their frequencies.

For example, key phrases VSM 320 may perform Natural language processing (NLP) processing of an input as known in the art e.g., sentence boundary detection, tokenization, stemming, POS tagging, Key phrase extraction and stop words filtering. Identified key phrases may be indexed according to their frequencies.

For example, key phrases VSM 320 may identify sentence boundaries as explained in http://en.wikipedia.org/wiki/Sentence_boundary_disambiguation. For example, by identifying sentence boundaries, key phrases VSM 320 may split transcription 227 into sentences.

Key phrases VSM 320 may tokenize transcription 227 as explained in http://en.wikipedia.org/wiki/Tokenization_(lexical_analysis). For example, key phrases VSM 320 may create separate words from a combination of words or terms (for example, tokenization may convert "don't" to "do not").

Key phrases VSM 320 may process transcription 227 using stemming, e.g., as explained in http://en.wikipedia.org/wiki/Stemming. For example, using stemming, key phrases VSM 320 may determine that the stem of hiking or hiker is hike. Key phrases VSM 320 may process transcription 227 using part of speech (POS), e.g., as explained in http://en.wikipedia.org/wiki/Part-of-speech_tagging. Any other operations may be performed by in order to generate, create and provide an output key phrases list. Any of the operations performed by key phrases VSM 320 as described herein may be performed as part of processing transcription 227 and producing an output key phrases list.

For example, below is a sample output in the Russian language (word, POS, stem):

Добрый [Adjective nominative] Добрый
день [Noun nominative] день
банк [Noun nominative] банк
слушаю [Finite verb] слушать
вас [Personal pronoun accusative] вы
здравствуйте [Finite verb] здравствовать
у [Proper name genitive] у
меня [Personal pronoun genitive] я
вот [Introduction particle] вот

Key phrases VSM 320 may perform key phrase extraction, e.g., extract key phrases from an input transcription. For example, key phrases VSM 320 may create rules for extracting key phrases from transcription 227. For example, a rule may be a regular expression as known in the art that may be used to identify the most interesting or relevant parts of a sentence. For example, a rule may identify an occurrence of a verb immediately followed by another verb, such rule may identify all phrases which are verb by verb.

Key phrases VSM 320 may, e.g., based on stop words filtering as described, eliminate or remove from an output key phrases list phrases which include one of the stop words in a list, for example, a list of stop words for the English language that may be used by Key phrases VSM 320 may be found in http://www.ranks.nl/resources/stopwords.html.

A list of key phrases may be converted into, or otherwise used to create, a vector space model or VSM, e.g., using an STT dictionary as base terms as known in the art. For example, Key phrases VSM 320 may convert an output key phrases list may into a vector space model by using an STT dictionary as known in the art (e.g., as described in http://en.wikipedia.org/wiki/Vector_space_model). For example, the STT dictionary may define base terms and the vector space model's size may be the size of the STT dictionary.

Raw transcription VSM 330 may create and store a 1-Best transcription of transcription 227. For example, a 1-best transcription may be created using only the best path in the input transcription 227 as known in the art.

Generally, a combined index or structured data as shown by block 231 may include output from one, two or three components in indexing unit 230, e.g., structured data 231 or combined index 340 may include output of one or more of hybrid LM VSM 310, a key phrases VSM 320 and/or a raw transcription VSM 330. According to embodiments of the invention, outputs of hybrid LM VSM 310, key phrases VSM 320, and a raw transcription VSM 330 may be combined into a combined index. For example, a combined index may be a single list or file, content in a memory segment or a combined index may be otherwise provided as an object that includes the outputs.

As discussed, output from indexing unit 230 that may be a combined index or structured data may be provided to matching unit 240, e.g., as shown by structured data 231 in FIG. 2. As discussed, language models 250 may be used by, or provided as input to, matching unit 240. For example, each of language models 250 may include a language model created based on language or topic specific documents, e.g., using the STT dictionary as a word baseline. Each of language models 250 may include a VSM created based on language or topic specific documents, e.g., using the STT dictionary as a word baseline.

Matching unit 240 may match a combined index or structured data by calculating three scores, ranks or values for each of language models 250. For example, matching unit 240 may calculate a perplexity text score, rank or value for each of language models 250 with respect to an output of raw transcription VSM 330, e.g., a 1-Best transcription of transcription 227 produced by raw transcription VSM 330. For example, a perplexity text score calculated for each language model in each of language models 250 may be a measure of the ability or inability of the language model to deal with, or understand, the 1-Best transcription of transcription 227.

Calculating a perplexity is a well-known method of evaluating a language model with respect to text such as transcription 227. For example, calculating a perplexity may be as described in http://en.wikipedia.org/wiki/Perplexity and in https://web.stanford.edu/class/cs124/lec/language-modeling.pdf.

Matching unit 240 may use cosine similarity to calculate a score, rank or value for each of language models 250. Cosine similarity is a known method for calculating a similarity between documents, for example as explained in http://en.wikipedia.org/wiki/Cosine_similarity and/or http://en.wikipedia.org/wiki/Vector_space_model. For example, a similarity between an output key phrases list produced by key phrases VSM 320 and a VSM in each of language models 250 may be calculated and each of language models 250 may be associated with a score based on the calculation.

Matching unit 240 may calculate, using cosine similarity, a similarity between a lattice or list of words and sub-words produced by hybrid LM VSM 310 and a VSM in each of language models 250 and each language model may be associated with a score based on the calculation. Accordingly, each of language models 250 may be associated with three values or scores, a perplexity, a similarity with respect to key phrases and a similarity with respect to a word and sub-words lattice.

A final score for each of language models 250 may be calculated using the formula below:

$$Score = NPer*A + CSKP*B + CSHT*(1-A-B)$$

Where:
NPer—Is the perplexity of the transcription and the LM.
A, B—weight factors (for example, A=0.2, B=0.4)
CSKP—Cosine Similarity of Key phrases
CSHT—Cosine Similarity of Hybrid Transcription Matching unit 240 may normalize the perplexity values to [0, 1] by scaling so that the lowest perplexity score is 0 and the highest perplexity score is 1. For example, given perplexity scores of 179 (worst), 177, 170 and 163 (Best) scaling using x=(179−P)/(179−163) would produce the values 0, 0.125, 0.5625 and 1.

The language model associated with the highest final score may be selected, e.g., as shown by selected LM 241. For example, selected LM 241 may be provided to LM decoder 260 that may also receive phonetic lattice 217 as input. LM decoder 260 may use selected LM 241 to decode phonetic lattice 217 and produce final transcription 270.

Figure 6:
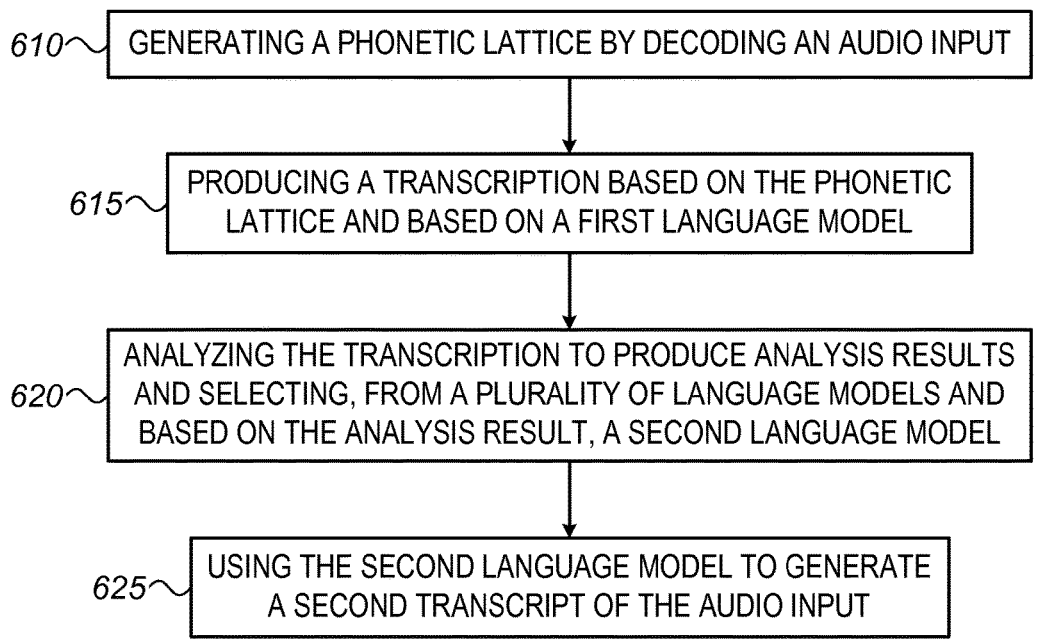
FIG. 6 shows a flowchart according to an embodiment of the present invention.

Reference is made to FIG. 6 that shows a flowchart according to an embodiment of the present invention. As shown by block 610, an embodiment of a method according to the invention may include generating a phonetic lattice by decoding an audio input. For example, phonetic lattice 217 may be generated or produced by acoustic decoder 215 as described herein. As shown by block 615, an embodiment of a method according to the invention may include producing a transcription based on the phonetic lattice and based on a first language model. For example, LM decoder 220 may produce transcription 227 based on main language model 225 and based on phonetic lattice 217 as described herein.

As shown by block 620, an embodiment of a method according to the invention may include analyzing the transcription to produce analysis results and selecting, from a plurality of language models and based on the analysis result, a second language model. For example, indexing unit 230 may produce analysis results in the form of structured data 231 and matching unit 240 may select one language model from the plurality of language models 250 based on structured data 231, e.g., as shown by FIG. 2 and described in related text herein. As shown by block 625, an embodiment of a method according to the invention may include using the second language model to generate a second transcript of the audio input. For example, using selected LM 241, LM decoder 260 may generate, produce or provide second or final transcription 270.

As further described herein, the first language model may be a general language model and the second language model may be a specific language model. For example, the first language model (e.g., main language model 225) may be a general model that may be used to identify common words in a language (e.g., English or Spanish) and the second language model (e.g., selected LM 241) may be a specific language model. For example, selected LM 241 may be a language model created for a specific jargon, vocabulary, slang, geographical region, age, profession, occupation and the like. For example, one of LM models 250 may be created based on a language used by students in a specific university or state, another one of LM models 250 may be created based on a language used by young people in upstate New York and so on.

As further described herein, an embodiment of a method according to the invention may include associating words identified in a transcription with a certainty value calculated for each identified word. For example, acoustic decoder may associate words identified in input audio 210 with a certainty value as described herein. An embodiment of a method according to the invention may further include including words associated with a certainty value higher than a first threshold value in a combined index. For example, only words associated with a first threshold (e.g., a certainty value greater than θ) may be included in structured data 231. An embodiment of a method according to the invention may further include combining at least two sub-words identified in the transcription to produce a word and including the produced word in the combined index. For example, hybrid LM VSM 310 may include sub-words identified transcription 227 in combined index 340 or structured data 231 as described herein. An embodiment of a method according to the invention may further include using a combined index to select the second language model. For example, matching unit 240 may use combined index 340 to select one of language models 250 as described herein. An embodiment of a method according to the invention may include identifying key phrases in a transcription and including the key phrases in a combined index. For example, key phrases 320 may identify key phrases in transcription 227 and include the identified key phrases in a combined index 340 as described herein. An embodiment of a method according to the invention may include selecting a second language model based on calculating a plurality of match values. As described, the plurality of match values may be calculated by relating a plurality of specific language models (e.g., language models 250) to a combined index (e.g., combined index 340). As described, e.g., with reference to matching unit 240, an embodiment of a method according to the invention may include selecting a specific language model to be used for decoding a transcript of an input audio content by selecting the language model that is associated with the highest match value.

As described, an embodiment of a method according to the invention may include associating sub-words identified in a transcription with a certainty value calculated for each identified sub-word. For example, a certainty value for identified sub-word may be calculated as described herein. An embodiment of a method according to the invention may include identifying a sequence of sub-words associated with a certainty value higher than a second threshold value, producing a word based on the identified sequence of sub-words and including the produced word in the combined index. For example, hybrid LM VSM 310 may identify areas in input transcript 227 where the certainty of sequences of sub-words is higher than a defined level or value, convert the identified sub-words into words and include the words in combined index 340.

Unless explicitly stated, the method embodiments described herein are not constrained to a particular order in time or chronological sequence. Additionally, some of the described method elements may be skipped, or they may be repeated, during a sequence of operations of a method.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

Various embodiments have been presented. Each of these embodiments may of course include features from other embodiments presented, and embodiments not specifically described may include various features described herein.

The invention claimed is:

1. A computer-implemented method of generating a transcript of an audio input, the method comprising:
generating a phonetic lattice by decoding the audio input;
producing a transcription based on the phonetic lattice and based on a first language model;
associating words identified in the transcription with a certainty value calculated for each identified word;
including words associated with a certainty value higher than a first threshold value in a combined index;
selecting, from a plurality of language models and based on the combined index, a second language model; and
generating a second transcription of the audio input based on the phonetic lattice and using the second language model.

2. The method of claim 1, wherein the first language model is a general model and the second language model is a specific language model.

3. The method of claim 1, comprising:
combining at least two sub-words identified in the transcription to produce a word and including the produced word in the combined index.

4. The method of claim 1, comprising identifying key phrases in the transcription and including the key phrases in the combined index.

5. The method of claim 1, comprising, selecting the second language model based on calculating a plurality of match values by relating a respective plurality of specific language models to the combined index and selecting the specific language model associated with the highest match value.

6. The method of claim 1, comprising:
associating sub-words identified in the transcription with a certainty value calculated for each identified sub-word;
identifying a sequence of sub-words associated with a certainty value higher than a second threshold value;
producing a word based on the identified sequence of sub-words; and
including the produced word in the combined index.

7. A computer-implemented method of generating a transcript of an audio input, the method comprising:
producing a first transcription of the audio input using a first language model;
associating words identified in the first transcription with a certainty value calculated for each identified word;
including words associated with a certainty value higher than a first threshold value in a structured data;
selecting, from a plurality of language models, a second language model by matching the plurality of language models with the structured data; and
producing a second transcription of the audio input using the second language model.

8. An article comprising a non-transitory computer-readable storage medium, having stored thereon instructions that, when executed by a controller, cause the controller to:
generate a phonetic lattice by decoding the audio input;
produce a transcription based on the phonetic lattice and based on a first language model;
associate words identified in the transcription with a certainty value calculated for each identified word;
include words associated with a certainty value higher than a first threshold value in a combined index;
select, from a plurality of language models and based on the combined index, a second language model; and
use the second language model and the phonetic lattice to generate a second transcript of the audio input.

9. The article of claim 8, wherein the first language model is a general model and the second language model is a specific language model.

10. The article of claim 8, wherein the instructions when executed further result in:
combining at least two sub-words identified in the transcription to produce a word and including the produced word in the combined index.

11. The article of claim 8, wherein the instructions when executed further result in identifying key phrases in the transcription and including the key phrases in the combined index.

12. The article of claim 8, wherein the instructions when executed further result in selecting the second language model based on calculating a plurality of match values by relating a respective plurality of specific language models to the combined index and selecting the specific language model associated with the highest match value.

13. The article of claim 8, wherein the instructions when executed further result in:
associating sub-words identified in the transcription with a certainty value calculated for each identified sub-word;
identifying a sequence of sub-words associated with a certainty value higher than a second threshold value;
producing a word based on the identified sequence of sub-words; and
including the produced word in the combined index.

* * * * *